(12) United States Patent
Wang et al.

(10) Patent No.: US 7,656,521 B2
(45) Date of Patent: *Feb. 2, 2010

(54) METHOD OF INSTRUMENT STANDARDIZATION FOR A SPECTROSCOPIC DEVICE

(75) Inventors: Yongdong Wang, Wilton, CT (US); Bernhard H. Radziuk, Frickingen (DE); David H. Tracy, Norwalk, CT (US)

(73) Assignee: PerkinElmer LAS, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/119,239

(22) Filed: May 12, 2008

(65) Prior Publication Data

US 2008/0246956 A1    Oct. 9, 2008

Related U.S. Application Data

(63) Continuation of application No. 11/552,361, filed on Oct. 24, 2006, now Pat. No. 7,405,821, which is a continuation of application No. 10/370,910, filed on Feb. 20, 2003, now Pat. No. 7,145,650.

(30) Foreign Application Priority Data

Feb. 22, 2002   (DE) ................. 102 07 733

(51) Int. Cl.
    *G01J 3/00* (2006.01)
(52) U.S. Cl. ..................................... 356/300
(58) Field of Classification Search ............... 356/326
    See application file for complete search history.

(56) References Cited

U.S. PATENT DOCUMENTS

| | | | |
|---|---|---|---|
| 3,631,237 | A | 12/1971 | Sole et al. |
| 5,455,673 | A | 10/1995 | Alsmeyer et al. |
| 5,615,673 | A | 4/1997 | Berger et al. |
| 5,710,713 | A | 1/1998 | Wright et al. |
| 5,850,623 | A | 12/1998 | Carman, Jr. et al. |
| 6,002,480 | A | 12/1999 | Izatt et al. |
| 6,067,156 | A | 5/2000 | Slater et al. |
| 6,184,982 | B1 | 2/2001 | Karanassios |
| 6,549,861 | B1 | 4/2003 | Mark et al. |
| 6,580,071 | B2 | 6/2003 | Weinberger et al. |
| 2002/0096631 | A1 | 7/2002 | Andrien, Jr. et al. |
| 2002/0117629 | A1 | 8/2002 | Fujimaki et al. |
| 2003/0155500 | A1 | 8/2003 | Syage et al. |
| 2004/0011951 | A1 | 1/2004 | Giles et al. |

*Primary Examiner*—Kara E Geisel
(74) *Attorney, Agent, or Firm*—St. Onge Steward Johnston & Reens LLC

(57) ABSTRACT

In a spectroscopic process a sample for producing a test spectral line or spectrum of at least one component contained in the sample is stimulated and the transmitted and/or emitted electromagnetic rays are used to create the test spectral line or spectrum. In order to improve such a spectroscopic process to such an extent that variations of certain parameters, which alter the shape and/or occurrence of a spectral line, are compensated, a comparison spectral line or spectrum of a known comparison material is produced under substantially the same parameters as the sample. The comparison spectral line or spectrum is compared with an ideal comparison spectral line or spectrum in order to calculate a transfer function, and the transfer function is applied to the test spectral line or spectrum in order to calculate a corrected test spectral line or spectrum.

24 Claims, 2 Drawing Sheets

METHOD OF INSTRUMENT STANDARDIZATION FOR A SPECTROSCOPIC DEVICE

CROSS-REFERENCE TO RELATED APPLICATION

This application is a continuation of U.S. patent application Ser. No. 11/552,361, filed Oct. 24, 2006 now U.S. Pat. No. 7,405,821, which is a continuation of U.S. patent application Ser. No. 10/370,910, filed Feb. 20, 2003, now issued as U.S. Pat. No. 7,145,650.

FIELD OF THE INVENTION

The present invention relates to an improved method of standardization for a spectroscopic device, and more particularly to such a method of standardization which corrects for variations of certain parameters which may alter the shape and/or occurrence of a spectral line.

BACKGROUND OF THE INVENTION

The invention relates to a spectroscopic process whereby, in a spectroscopic device, at least one sample for producing a test spectral line or spectrum of at least one component contained in the sample is stimulated and the transmitted and/or emitted electromagnetic ray is conducted through an optic system, possibly with a spectrometer, of a detector device in order to record the test spectral line or spectrum.

Such a spectroscopic process is common, for instance, in atomic absorption spectroscopy. There, a corresponding sample is vaporized, for instance in a graphite furnace, and the vaporized sample is stimulated by monochromatic or continuously electromagnetic radiation. With atomic absorption spectroscopy, part of the electromagnetic radiation is absorbed by at least one component of the sample. Absorption of the electromagnetic ray thus corresponds to a stimulation of the component. Because the absorbed ray is absent in the transmitted electromagnetic ray, there is a corresponding spectral line, which is characteristic for the corresponding component of the sample. The transmitted electromagnetic ray in the spectroscopic process and also in the atomic absorption spectroscopy is conducted in the direction of a detector device by means of an optic system and possibly through the use of a spectrometer. The detector device serves to record the test spectral line, which is characteristic for the absorption, by the corresponding component of the sample. If a continuous electromagnetic ray is used, then an entire test spectrum can also be recorded. Hereafter, the term "spectral line" is used, although it should be understood that this term is also meant to encompass the situation where an entire "spectrum" is recorded.

A disadvantage of the spectroscopic process known in general practice is that changes, for instance of certain parameters such as temperature, pressure, and so on, which can result in a modification of the test spectral line are not recorded and can result in a displacement of, and possibly also a change in the intensity of, the spectral line. As a result, in an extreme case, with closely situated spectral lines of various components of a sample, misdiagnosis can occur concerning at least one of these components. In addition, even with correct coordination of the spectral lines with respect to a certain component of the sample, the result can be various spectral lines at various points of measurement for various spectroscopic devices on various days with the same component.

The invention therefore is concerned with improving a spectroscopic process of the aforementioned type to such an extent that variations of certain parameters, which alter the shape and/or occurrence of a spectral line, are compensated, so that, independently of modifications of these parameters, an ideal test spectral line is received.

SUMMARY OF THE INVENTION

In keeping with the invention, a comparison material is used along with the sample. A corresponding comparison spectral line is provided for this comparison material. This comparison spectral line is subjected to a modification in shape and position in the wavelength or frequency range, if changes are made in corresponding parameters, such as temperature, pressure, mechanical wear of the spectroscopic device, the setting of the spectroscopic device, points of measurement, or the like. For the comparison spectral line an ideal comparison spectral line is known, based on prescribed standard values of the parameters. The prescribed standard values correspond, for example, to a particular temperature, a particular pressure, a particular condition of the spectroscopic device, or the like. By comparing the measured comparison spectral line and the ideal comparison spectral line, a transfer function is obtained from both. This function corresponds to a mathematical filter, which, where software is concerned for instance, is applied to corresponding spectral lines and especially to the measured test spectral line. By using the transfer function, one receives from the test spectral line an ideal test spectral line, which results in an ideal test spectral line that is comparable in simple manner with the spectral detection, independently of the real existing parameters in the spectral investigation.

As already stated, the spectroscopic process according to the invention can also be used on corresponding spectrums as a whole. In addition, it is also possible to obtain a corresponding spectral line or spectrum for radiation emitted by the corresponding component. In this case as well, the foregoing statements also apply.

To obtain simplified access to the component or components of the sample, the sample is brought into its gaseous state before it is stimulated. Depending on the comparison material in use, it too is vaporized.

To simplify the spectroscopic process, samples and comparison material can be vaporized, stimulated, and/or spectrally examined in the same spectroscopic device. In the simplest case, not just vaporization but stimulation as well as spectral examination occurs in the same spectroscopic device, so that all the various parameters of the spectroscopic device can be taken into account in simple manner through the transfer function. If, for instance, the vaporization or stimulation or spectral measurement occurs in various spectroscopic devices, further transfer functions may be necessary in order to take into account the various parameters of the various spectroscopic devices.

To simplify the spectroscopic process still further and to improve its reproduceability and the use of the transfer function, the sample and comparison material can be vaporized, stimulated, and/or spectrally examined simultaneously. If everything is carried out simultaneously for the sample and comparison material, the transfer function also takes into account all variants in the parameters of the spectroscopic device and/or of the spectroscopic process. For instance, if the stimulation of the sample and comparison material do not occur simultaneously, a residual error could possibly remain, through the reported transfer function, in the stimulation of the sample and the comparison material. However, these errors can be so minor that any delayed vaporization or spectral examination of the sample and comparison material can be tolerated.

Depending on the detector device in use with the detector attachment, it may be necessary for the sample and comparison material to be spectrally examined separately, in particular at a certain time interval. This is acceptable if the parameters for the period of the spectral examination of the sample and comparison material, parameters which can possibly alter the spectral examination, are altered only to a minor extent or not at all.

However, in order to be able to conduct a spectral examination simultaneously, the detector device can have two detector attachments, one of which spectrally examines the sample while the other examines the comparison material. A corresponding optic system with spectrometers can result, for instance, in a splitting of the electromagnetic ray of the sample and the comparison material so that in each case the corresponding electromagnetic ray falls onto the related detector attachment.

It is theoretically possible also to investigate the corresponding test function with unknown comparison material, if this material for instance is always an additional component of the sample. If the spectral line of this comparison material is easy to examine, then corresponding changes in shape and length of the spectral line can also be recorded and a corresponding transfer function can be applied to these modifications. This transfer function can also be applied to the relevant component of the sample.

If the comparison material is known, then associated with it there is an ideal comparison spectral line, which can be stored in the spectroscopic device or in an analytical device attached thereto. By comparing the measured comparison spectral line with the ideal comparison spectral line, the corresponding transfer function can be investigated. This can occur automatically by means of corresponding software. Then the investigated transfer function is applied to the test spectral line and in this manner an ideal test spectral line is received.

If, for instance, the temperature varies between different readings of the spectral line of a particular component of the sample, this may result in a wavelength/frequency modification of the test spectral line. The transfer function can compensate for such wavelength/frequency modification and thus also for the temperature variation.

A temperature change, however, can also modify a line thickness in the spectroscopic device, so that the resolution of the spectroscopic device changes. Such a change can also be compensated by a corresponding transfer function.

One example of a simple and reasonably priced comparison material, which is not required to be vaporized at customary temperatures in the atomic absorption spectroscopy, is neon. This comparison material shows a relatively simple spectral line at 296.72 nm, which can serve well to convey corresponding transfer functions. However, other comparison materials and/or other orders of spectral lines of neon or other comparison materials can also be used. Neon is also desirable due to the fact that it, like helium, argon, krypton, xenon and radon, is an inert gas which does not readily react with most other materials.

If a number of measurements have already been taken with the same comparison material, it is also possible that a series of comparison spectral lines can be stored in the analytic device of the electroscopic device, especially for different parameters. By comparing the stored comparison spectral line with a comparison spectral line that has actually been newly recorded, a corresponding transfer function can be examined and applied on a test spectral line. In this case, the result for the test spectral line is a new test spectral line which corresponds to the stored spectral line which has been called up. As a result, it is possible to make comparisons between spectral lines recorded with different parameters without deriving the recorded spectral lines from ideal spectral lines.

It is possible to break down the parameters roughly into two groups. One group are the measurement parameters, which for instance correspond to physical values such as temperature, pressure, or the like. The other group are the device parameters, which result from different degrees of mechanical wear of the spectroscopic device, various settings, various places of construction, or the like. Through this invention, it is possible to determine transfer functions separately for variations in the measurement parameters and the device parameters, and to apply them accordingly to the test spectral lines.

The invention and its particular features and advantages will become more apparent from the following detailed description considered with reference to the accompanying drawings.

DETAILED DESCRIPTION OF AN EMBODIMENT OF THE INVENTION

Figure 1:
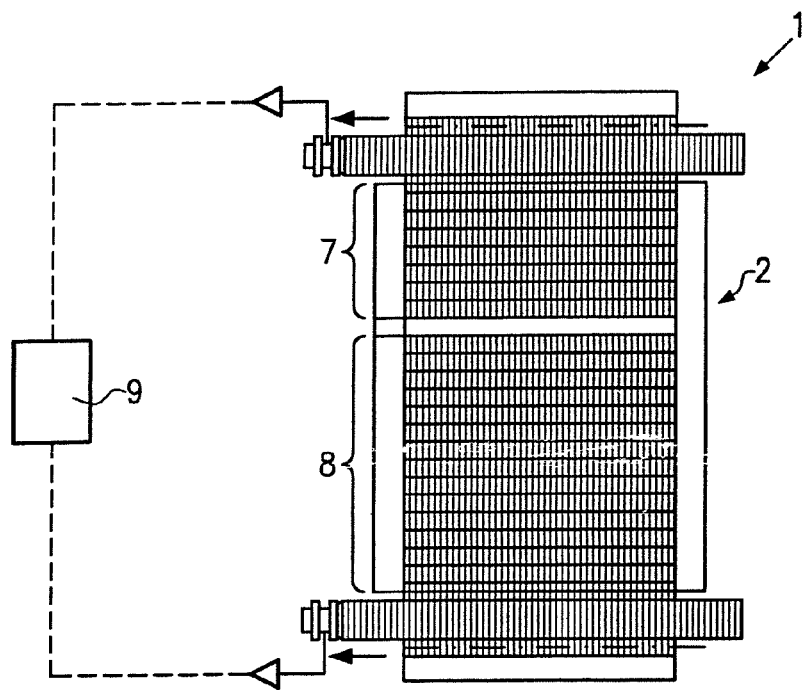
FIG. 1 is a schematic view of a spectroscopic device for conducting the spectroscopic standardization process of the invention, with special emphasis on the detector device and the analytic device.

Shown in FIG. 1 are a detector device 2 and an analytic device 9 of a spectroscopic device 1, which serves to conduct the spectroscopic process of this invention. For purposes of simplification, and because such elements are well known in the art, the illustration does not show features such as a monochromatic ray source for instance, a vaporization furnace, and an optic system that may include a spectrometer.

The detector device 2 has two detector attachments 7, 8. The upper detector attachment 7 shown in FIG. 1 serves to investigate a comparison spectral line for a comparison material. The lower detector attachment 8 in FIG. 1 serves to investigate a spectral line of a component of a sample, where the sample and comparison material are vaporized simultaneously, stimulated by electromagnetic ray, and spectrally investigated. Vaporization and stimulation ensue in the nonillustrated portion of the spectrometer, which may be for example an atomic absorption spectrometer or an optical emission spectrometer.

An ideal comparison spectral line is stored, for instance, in analytical unit 9. FIG. 3 shows an example of this. The abscissa of the graph plots the wavelength or frequency and the ordinate plots the intensity. The ideal comparison spectral line 5, according to FIG. 3, is a spectral line of neon at 296.72 nm at particular ideal temperature conditions. However, if the temperature of the spectroscopic device, of the optic system, and/or of the detector unit 2 varies, then the result can be a displacement of the spectral line. Comparison spectral lines 4 displaced in this way are shown, for instance, in FIG. 2. This leads to a displacement toward the right, that is, to high wavelength and simultaneously a decrease in intensity with increasing temperature values.

Figure 2:
FIG. 2 is a graphical representation showing a series of comparison spectral lines at various temperatures which may be produced by the spectroscopic device of FIG. 1.
Figure 3:
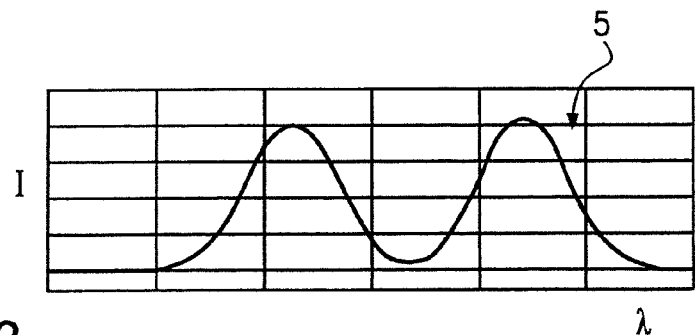
FIG. 3 is a graphical representation showing an ideal comparison spectral line at various temperatures which may be produced by the spectroscopic device of FIG. 1.
Figure 4:
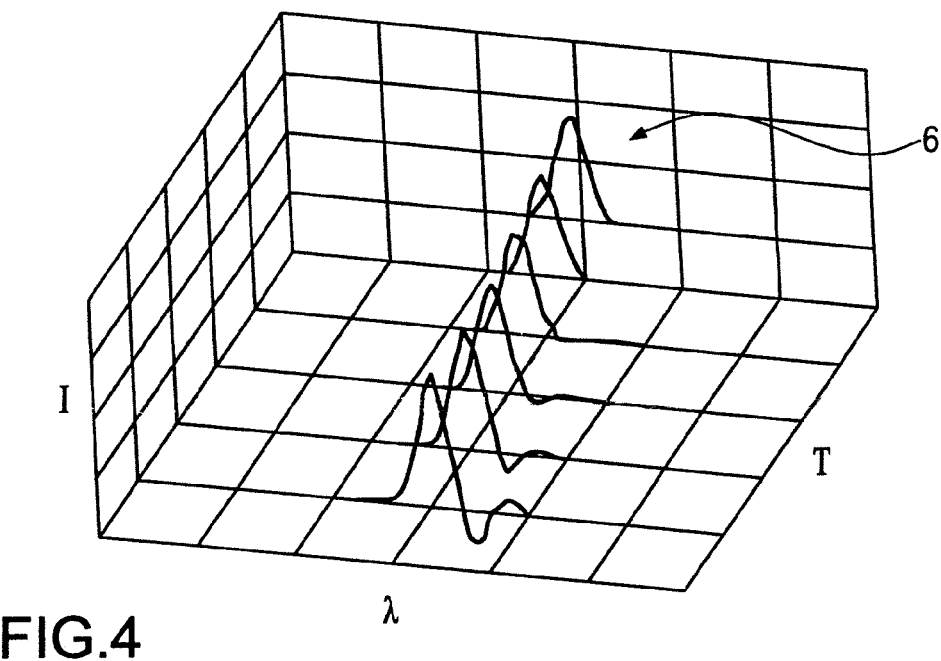
FIG. 4 is a graphical representation showing a series of transfer functions for various temperatures as variable parameters which may be used by the spectroscopic standardization process employed by the spectroscopic device of FIG. 1.

Comparison of the ideal comparison spectral line 5 in FIG. 3 with a comparison spectral line 4 actually recorded at a certain temperature value leads to a so-called transfer function or a filter function ($f$), a number of which are illustrated in FIG. 4 with reference number 6 for the various temperature values of FIG. 2. In this case the transfer functions 6 are shown successively as dependent on various temperature values. Thus:

$$R*f=R_0$$

wherein
  $f$ is the unknown transfer function or filter function,
  $R_0$ is the ideal comparison spectral line 5 in FIG. 3, and
  R is the comparison spectral line 4 in FIG. 2 actually recorded at a certain temperature value.

Thus, an ideal comparison spectral line ($R_0$) can be determined by convoluting a known comparison spectral line (R) with a known transfer function or filter function ($f$). Similarly, an unknown transfer function or filter function ($f$) can be determined by deconvoluting a known comparison spectral line (R) out of a known ideal comparison spectral line ($R_0$). Use of a corresponding transfer function ($f$) on a related comparison spectral line 4 according to FIG. 4 leads to an ideal comparison spectral line 5 according to FIG. 3.

Figure 5:
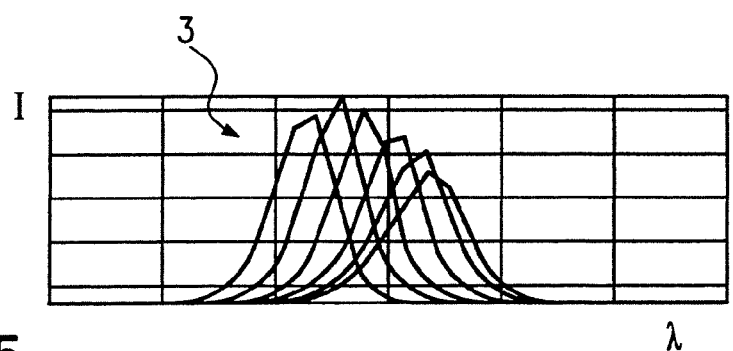
FIG. 5 is a graphical representation showing a series of test spectral lines for the same temperatures as in the comparison spectral lines according to FIG. 2 which may be produced by the spectroscopic device of FIG. 1.
Figure 6:
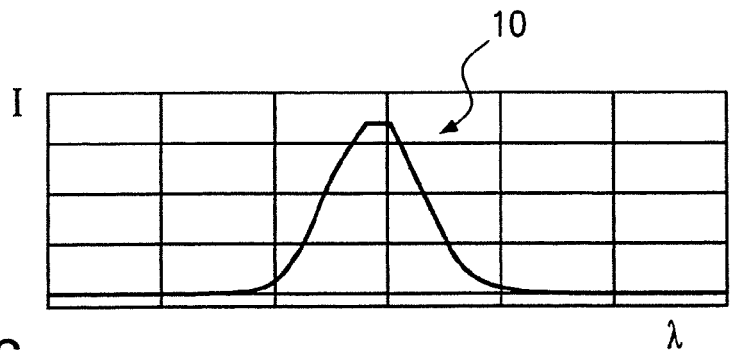
FIG. 6 is a graphical representation showing an ideal test spectral line compensated by means of a transfer function with respect to temperature variations which may be produced by the spectroscopic device of FIG. 1.

The transfer function ($f$) received in this way is also applied to a corresponding test spectral line, which was provided by the detector attachment 8 of FIG. 1 for the corresponding component of the sample. Various test spectral lines 3 for various temperature values are shown in FIG. 5, where these temperature values correspond to those in FIG. 2 and there is a corresponding transfer function 6 according to FIG. 4 is associated to each of these temperature values. The application of the related transfer functions 6 to the test spectral lines 3 according to FIG. 5, where the transfer function is selected corresponding to the temperature value, leads to an ideal test spectral line 10 according to FIG. 6. Thus:

$$A*f=A_0$$

wherein
  $A_0$ is the unknown ideal test spectral line 10 according to FIG. 6,
  $f$ is the transfer function or filter function, and
  A is the test spectral line 3 according to FIG. 5.

In this connection, it is important to note that the foregoing discussion, in order to simplify the description, deals only with transfer functions 6 that depend on the temperature value, where corresponding displacements of the spectral lines and shape changes, that is, modifications in the intensity of the spectral lines, arose through differences in temperature values. If other parameters in the spectroscopic device, such as pressure, mechanical wear of the device, set-up location of the device, or the like, are changed, other transfer functions can be obtained, which take into account the variation of all these parameters including variation of the temperature and serve to compensate these modifications. The compensation ensues in such a way as to compensate for certain pre-established values of the parameters, where these values of the parameters determine the corresponding ideal spectral lines according to FIGS. 3 and 6.

Use of the transfer function leads to an improved comparison possibility for spectral lines, which were recorded at various times at various places by various people and the like. Variations of spectral lines on the basis of corresponding variations of parameters in measurement are compensated by the transfer function, so that in every case a comparison of the measurement results is possible in a safe and simple way, independently of the aforementioned parameters.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A spectroscopic device comprising:
  a detector for receiving light from a sample and a comparison material, wherein the sample and the comparison material were simultaneously stimulated, said detector producing a first signal indicative of a test spectral line or spectrum of at least one component contained in the sample, and producing a second signal indicative of a comparison spectral line or spectrum of the comparison material;
  an analytical unit that compares the second signal indicative of the comparison spectral line or spectrum produced using the detector with an ideal comparison spectral line or spectrum to calculate a transfer function derived from the comparison spectral line or spectrum and the ideal comparison spectral line or spectrum, the transfer function derived independently of the sample spectral line or spectrum, and that applies the transfer function to the test spectral line or spectrum to calculate a corrected test spectral line or spectrum; and
  wherein the ideal comparison spectral line or spectrum is generated based on prescribed values of parameters selected from the group consisting of: temperature, pressure, mechanical wear of the spectroscopic device, the setting of the spectroscopic device, and points of measurement.

2. The spectroscopic device according to claim 1 wherein the sample and the comparison material were converted into a gaseous condition before producing the first and second signals.

3. The spectroscopic device according to claim 2 wherein the sample and the comparison material were vaporized, stimulated, and spectrally investigated in the same spectroscopic device.

4. The spectroscopic device according claim 3 wherein the sample and the comparison material were simultaneously vaporized.

5. The spectroscopic device according to claim 1 wherein the ideal comparison spectral line or spectrum is stored in the spectroscopic device or in an examination device relating to it and is retrieved for the calculation of the transfer function.

6. The spectroscopic device according to claim 1 wherein the transfer function is applied to the test spectral line or spectrum to compensate for a wavelength or frequency modification.

7. The spectroscopic device according to claim 1 wherein the transfer function is applied to the test spectral line or spectrum to compensate for a resolution modification of the spectroscopic device.

8. The spectroscopic device according to claim 1 wherein neon is used as the comparison material.

9. The spectroscopic device according to claim 1 wherein a series of comparison spectral lines or spectrums for various parameters are stored, and wherein, through a comparison with a comparison spectral line or spectrum that was actually recorded, a corresponding transfer function is obtained from the stored spectral lines or spectrums and retrieved for application to the test spectral line or spectrum.

10. The spectroscopic device according to claim 1 wherein the transfer function is applied to the test spectral line or spectrum as determined for variation of measurement parameters and device parameters.

11. The spectroscopic device according to claim 1 wherein the transfer function is applied to the test spectral line or spectrum as determined for variation of measurement parameters.

12. The spectroscopic device according to claim 1 wherein the transfer function is applied to the test spectral line or spectrum as determined for variation of device parameters.

13. A spectroscopic device comprising:
a detector having a first attachment and a second attachment, the detector receiving light from a sample and a comparison material, wherein the sample and the comparison material were simultaneously stimulated, said detector, producing a first signal indicative of a test spectral line or spectrum of at least one component contained in the sample using the first attachment, and producing a second signal indicative of a comparison spectral line or spectrum of the known comparison material using the second attachment; and
an analytical unit that compares the second signal indicative of the comparison spectral line or spectrum produced using the second attachment with an ideal comparison spectral line or spectrum to calculate a transfer function, and that applies the transfer function to the test spectral line or spectrum to calculate a corrected test spectral line or spectrum.

14. The spectroscopic device according to claim 13 wherein the sample and the comparison material were converted into a gaseous condition before producing the first and second signals.

15. The spectroscopic device according to claim 14 wherein the sample and the comparison material were vaporized, stimulated, and spectrally investigated in the same spectroscopic device.

16. The spectroscopic device according claim 15 wherein the sample and the comparison material were simultaneously vaporized.

17. The spectroscopic device according to claim 13 wherein the ideal comparison spectral line or spectrum is stored in the spectroscopic device or in an examination device relating to it and is retrieved for the calculation of the transfer function.

18. The spectroscopic device according to claim 13 wherein the transfer function is applied to the test spectral line or spectrum to compensate for a wavelength or frequency modification.

19. The spectroscopic device according to claim 13 wherein the transfer function is applied to the test spectral line or spectrum to compensate for a resolution modification of the spectroscopic device.

20. The spectroscopic device according to claim 13 wherein neon is used as the comparison material.

21. The spectroscopic device according to claim 13 wherein a series of comparison spectral lines or spectrums for various parameters are stored, and wherein, through a comparison with a comparison spectral line or spectrum that was actually recorded, a corresponding transfer function is obtained from the stored spectral lines or spectrums and retrieved for application to the test spectral line or spectrum.

22. The spectroscopic device according to claim 13 wherein the transfer function is applied to the test spectral line or spectrum as determined for variation of measurement parameters and device parameters.

23. The spectroscopic device according to claim 13 wherein the transfer function is applied to the test spectral line or spectrum as determined for variation of measurement parameters.

24. The spectroscopic device according to claim 13 wherein the transfer function is applied to the test spectral line or spectrum as determined for variation of device parameters.

* * * * *